United States Patent
Keen et al.

(10) Patent No.: US 11,557,218 B2
(45) Date of Patent: Jan. 17, 2023

(54) REFORMATTING DIGITAL CONTENT FOR DIGITAL LEARNING PLATFORMS USING SUITABILITY SCORES

(71) Applicant: INTERNATIONAL BUSINESS MACHINES CORPORATION, Armonk, NY (US)

(72) Inventors: Martin G. Keen, Cary, NC (US); Christopher John Rayns, Siler City, NC (US); Makenzie Manna, Poughkeepsie, NY (US); Kriti Kamra, Markham (CA)

(73) Assignee: International Business Machines Corporation, Armonk, NY (US)

( * ) Notice: Subject to any disclaimer, the term of this patent is extended or adjusted under 35 U.S.C. 154(b) by 72 days.

(21) Appl. No.: 17/303,693

(22) Filed: Jun. 4, 2021

(65) Prior Publication Data

US 2022/0392364 A1  Dec. 8, 2022

(51) Int. Cl.
*H04N 9/80* (2006.01)
*G09B 5/06* (2006.01)
*G06F 40/20* (2020.01)
*H04N 5/93* (2006.01)

(52) U.S. Cl.
CPC ............. *G09B 5/065* (2013.01); *G06F 40/20* (2020.01)

(58) Field of Classification Search
CPC ................................ G09B 5/065; G06F 40/20
USPC ................ 386/241, 239, 248, 326, 278, 281
See application file for complete search history.

(56) References Cited

U.S. PATENT DOCUMENTS

| | | | |
|---|---|---|---|
| 7,493,396 B2 | 2/2009 | Alcorn |
| 7,860,736 B2 | 12/2010 | Draper |
| 10,490,092 B2 | 11/2019 | Dohring |
| 2002/0188583 A1 | 12/2002 | Rukavina |
| 2004/0086833 A1 | 5/2004 | Goldberg |
| 2008/0138786 A1 | 6/2008 | Redd |
| 2014/0220535 A1 | 8/2014 | Angelone |
| 2015/0056596 A1 | 2/2015 | Bercovitz |

(Continued)

FOREIGN PATENT DOCUMENTS

CN    111914760 A    3/2021

OTHER PUBLICATIONS

Marras et al., "Equality of Learning Opportunity via Individual Fairness in Personalized Recommendations," arXiv:2006.04282v2 [cs.IR] Oct. 27, 2020, Retrieved from the Internet: https://arxiv.org/pdf/2006.04282.pdf, 42 pages.

(Continued)

*Primary Examiner* — Robert Chevalier
(74) *Attorney, Agent, or Firm* — Elliot J. Shine

(57) ABSTRACT

A method, computer system, and a computer program product for digital content development is provided. The present invention may include identifying one or more keywords associated with a digital course received from a digital content developer. The present invention may include identifying one or more relevant digital courses of one or more digital learning platforms. The present invention may include analyzing one or more relevant digital courses using one or more analytical techniques. The present invention may include evaluating the course received from the digital content developer. The present invention may include generating one or more new digital courses for each of the one or more digital learning platforms.

20 Claims, 5 Drawing Sheets

(56) References Cited

U.S. PATENT DOCUMENTS

| | | |
|---|---|---|
| 2015/0206441 A1 | 7/2015 | Brown |
| 2020/0125618 A1 | 4/2020 | Yang |
| 2021/0027645 A1* | 1/2021 | Nicol .................... H04L 67/131 |
| 2021/0233423 A1* | 7/2021 | Nedivi .................. H04L 65/611 |

OTHER PUBLICATIONS

Mell et al., "The NIST Definition of Cloud Computing," National Institute of Standards and Technology, Special Publication 800-145, Sep. 2011, pp. 1-7.

International Searching Authority, Notification of Transmittal of the International Search Report and the Written Opinion of the International Searching Authority, or the Declaration, File Reference PF220418PCT, International application No. PCT/CN2022/096246, International Filing Date May 31, 2022, dated Aug. 25, 2022, 9 pages.

\* cited by examiner

REFORMATTING DIGITAL CONTENT FOR DIGITAL LEARNING PLATFORMS USING SUITABILITY SCORES

BACKGROUND

The present invention relates generally to the field of computing, and more particularly to digital content development.

A digital content developer may publish digital course content to one or more digital learning platforms. Digital course content may be learning and/or instructional materials such as, but not limited to, video lectures, bulleted text slides, architectural diagrams, audio recordings, presentation materials, lab exercises, offline exercises, amongst other learning and/or instructional materials. Each of the one or more digital learning platforms may feature at least, different pricing, format suitability, duration requirements, completion certificates, state and/or government licensed courses, amongst other features.

Furthermore, the same digital course content may be advantageous for users on one digital platform but inadequate for users of another digital platform.

SUMMARY

Embodiments of the present invention disclose a method, computer system, and a computer program product for digital content development. The present invention may include identifying one or more keywords associated with a digital course received from a digital content developer. The present invention may include identifying one or more relevant digital courses of one or more digital learning platforms. The present invention may include analyzing one or more relevant digital courses using one or more analytical techniques. The present invention may include evaluating the course received from the digital content developer. The present invention may include generating one or more new digital courses for each of the one or more digital learning platforms.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
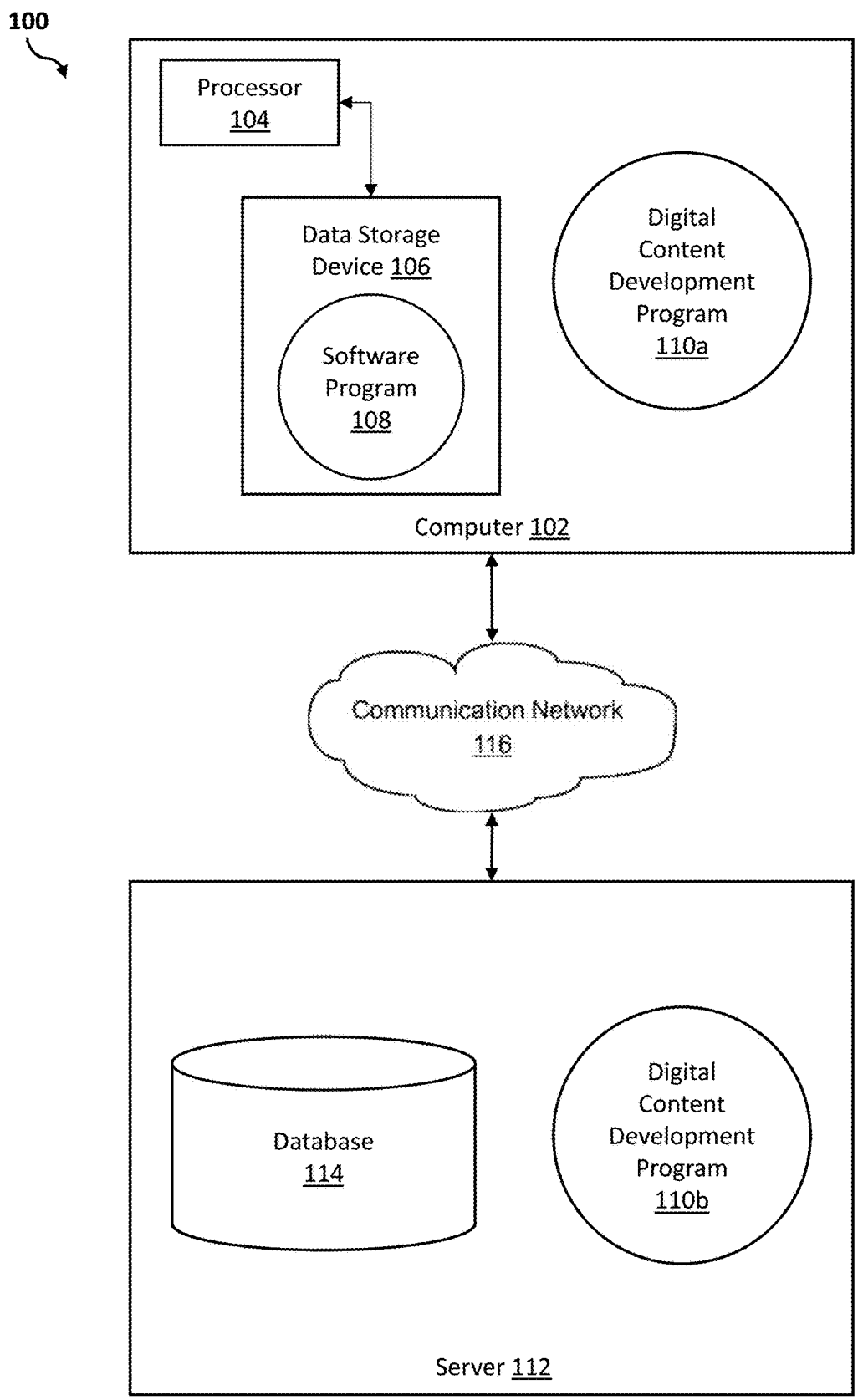
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for digital content development. As such, the present embodiment has the capacity to improve the technical field of digital content development by generating one or more new digital courses for one or more digital learning platforms based on a suitability score determined for each classification of each asset of a plurality of instructional content received from a digital content developer. More specifically, the present invention may include identifying one or more keywords associated with a digital course received from a digital content developer. The present invention may include identifying one or more relevant digital courses of one or more digital learning platforms. The present invention may include analyzing one or more relevant digital courses using one or more analytical techniques. The present invention may include evaluating the course received from the digital content developer. The present invention may include generating one or more new digital courses for each of the one or more digital learning platforms.

As described previously, digital content developer may publish digital course content to one or more digital learning platforms. Digital course content may be learning and/or instructional materials such as, but not limited to, video lectures, bulleted text slides, architectural diagrams, audio recordings, presentation materials, lab exercises, offline exercises, amongst other learning and/or instructional materials. Each of the one or more digital learning platforms may feature at least, different pricing, format suitability, duration requirements, completion certificates, state and/or government licensed courses, amongst other features.

Furthermore, the same digital course content may be advantageous for users on one digital platform but inadequate for users of another digital platform.

Therefore, it may be advantageous to, among other things, identify one or more keywords associated with a digital course received from a content developer, wherein the digital course is comprised of a plurality of instructional content, identify one or more relevant digital courses of the one or more digital learning platforms using the one or more keywords associated with the digital course received from the digital content developer, analyze the one or more relevant digital courses using one or more analytical techniques, evaluate the digital course received from the digital content developer for each of the one or more digital learning platforms, and generate one or more new digital courses for each of the one or more digital learning platforms using the plurality of instructional content of the digital course received from the digital content developer.

According to at least one embodiment, the present invention may improve digital course content by analyzing one or more digital learning platforms and reformatting the digital course content for each of the one or more digital learning platforms based on one or more factors.

According to at least one embodiment, the present invention may improve assigning a fair market value to digital course content for digital content developers using a pricing algorithm based on an analysis of existing course content hosted by one or more digital learning platforms.

According to at least one embodiment, the present invention may improve digital course content by reformatting and/or customizing the digital course content for each digital learning platform based on the user profiles of the digital learning platform.

According to at least one embodiment, the present invention may improve the education and/or instruction of users of digital learning platforms by reformatting digital course content based on a plurality of suitability scores, such as, but not limited to, format suitability, theme suitability, style suitability, duration suitability, and topic suitability.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a digital content development program 110a. The networked computer environment 100 may also include a server 112 that is enabled to run a digital content development program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the digital content development program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the digital content development program 110a, 110b (respectively) to generate platform specific digital courses using suitability scoring. The digital content development method is explained in more detail below with respect to FIG. 2.

Figure 2:
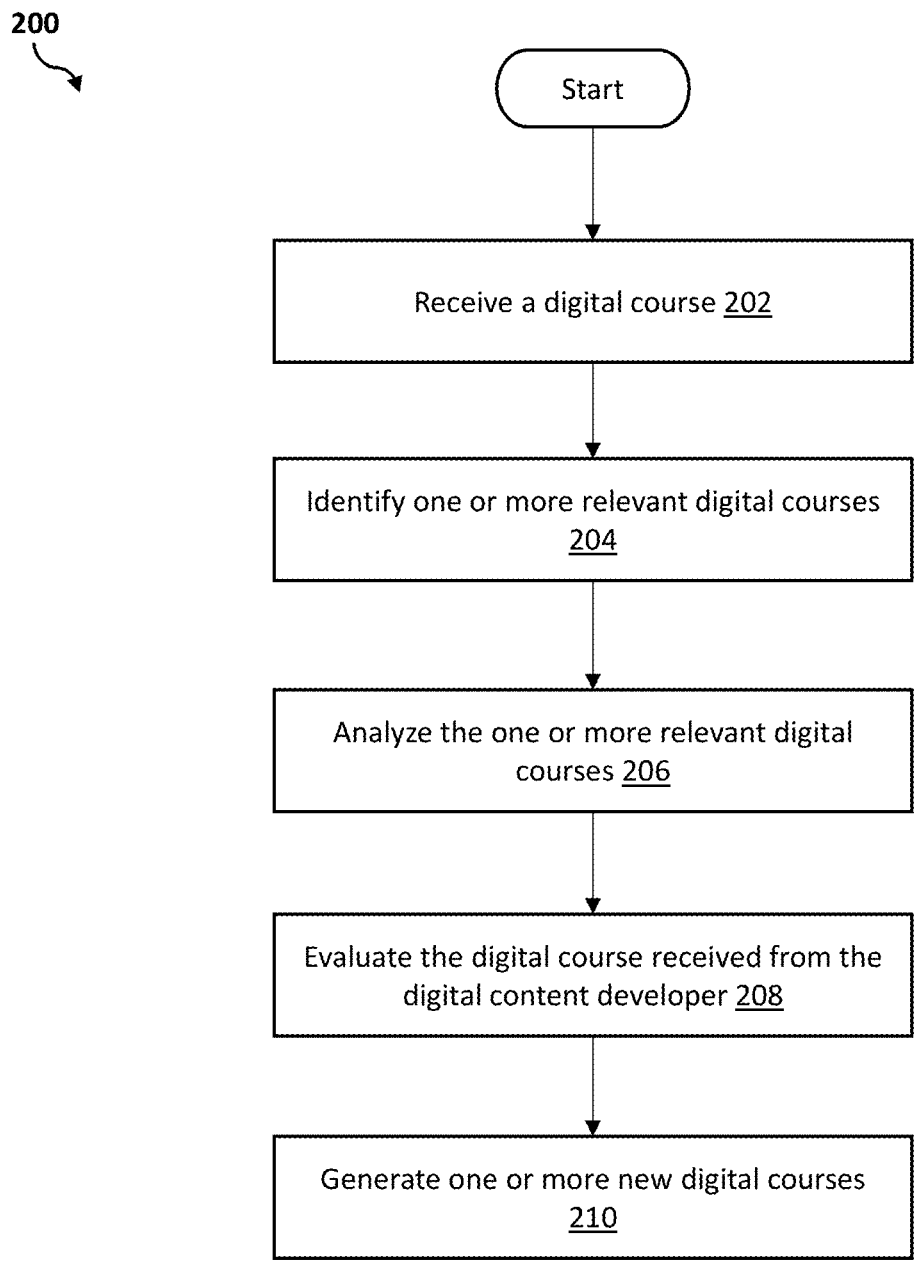
FIG. 2 is an operational flowchart illustrating a process for digital content development according to at least one embodiment.

Referring now to FIG. 2, an operational flowchart illustrating the exemplary digital content development process 200 used by the digital content development program 110a and 110b (hereinafter digital content development program 110) according to at least one embodiment is depicted.

At 202, the digital content development program 110 receives a digital course from a digital content developer. The digital course may be comprised of a plurality of instructional content such as, but not limited to, assets, video lectures, bulleted text slides, architectural diagrams, audio recordings, presentation materials, course outlines, course objectives, assigned reading materials, lab exercises, exams and/or quizzes, offline exercises, amongst other instructional content and/or assets. The plurality of instructional content of the digital course may include any and all content that may be available to users of a digital learning platform, while assets may refer to deliverables such as video lectures and/or lab exercises.

The digital content development program 110 may utilize one or more linguistic techniques in identifying one or more topics and/or one or more keywords associated with the digital course received from the digital content developer. The one or more linguistic techniques will be described in more detail below with respect to Step 204, but include at least a machine learning model with Natural Language Processing (NLP) for keyword extraction such as, but not limited to, IBM Watson® Natural Language Processing (Watson and all Watson-based trademarks are trademarks or registered trademarks of International Business Machines Corporation in the United States, and/or other countries). The digital content development program 110 may utilize the one or more linguistic techniques to identify the one or more topics and/or one or more keywords associated the the digital course from the plurality of instructional content. The digital content development program 110 may utilize the one or more topics and/or keywords identified utilizing the one or more linguistic techniques in identifying one or more digital learning platforms.

The digital content development program 110 may also identify one or more topics and/or keywords associated with the digital course based on input received from the digital content developer. The digital content development program 110 may also identify one or more digital learning platforms based on input from the digital content developer. The digital content developer may provide the digital content development program 110 with input such as, but not limited to, topics and/or keywords associated with the digital course, one or more digital learning platforms the digital content developer intends to provide with the digital course, amongst other additional information.

The digital content development program 110 may utilize at least the plurality of instructional content of the digital course received from the digital content developer and/or the input received from the digital content developer in determining one or more topics of the digital course and the one or more digital learning platforms for the digital course.

For example, the digital content development program 110 may receive a digital course and a plurality of input information from the digital content developer. The digital content development program 110 may utilize one or more linguistic techniques in determining that the keywords and/or topics for the digital course include "data privacy," "digital privacy," "security policy enforcement," and "data access" based on the course outline, course objectives, or other instructional content of the digital course. The digital content development program 110 may receive the following keywords and/or topics from the digital content developer, including, "trust authority" and "data privacy passports." Additionally, the digital content developer may identify Digital Learning Platform A as the digital learning platform the digital content provider intends to publish the digital course to. Using the one or more keywords and/or topics identified by the digital content development 110 from the plurality of instructional content and the plurality of input information received from the digital content developer the digital content development program 110 may analyze one or more digital learning platforms comprised of a plurality of digital courses. The content development program 110 may identify two relevant digital courses from the keywords and/or topics. One of the two relevant digital courses may be on Digital Learning Platform A and the other relevant digital course may be on Digital Learning Platform B.

At 204, the digital content development program 110 identifies one or more relevant digital courses. The digital content development program 110 may identify the one or more relevant courses by analyzing a plurality of digital courses of one or more digital learning platforms. The digital content development program 110 may identify the one or more relevant digital courses using the one or more keywords and/or topics identified from the plurality of instructional content of the digital course received from the content developer and/or the one or more keywords and/or topics identified based on the plurality of input information from the digital content developer at Step 202 above. The one or more relevant digital courses may be digital courses published on the one or more digital learning platforms that are similar to the digital course received from the digital content developer. The digital content development program 110 may perform a keyword search of the one or more digital learning platforms which may reveal one or more relevant courses based on overlapping (e.g., same, semantically similar) keywords with the keywords identified from the digital course received from the digital content developer.

The one or more digital learning platforms may be comprised of a plurality of digital courses. The digital courses may be comprised of a plurality of instructional content such as, but not limited to, assets, video lectures, bulleted text slides, architectural diagrams, audio recordings, presentation materials, course outlines, course objectives, assigned reading materials, lab exercises, exams and/or quizzes, offline exercises, amongst other instructional content and/or assets. The plurality of instructional content of the digital courses may include any and all content that may be available to users of a digital learning platform, while assets may refer to deliverables such as video lectures and lab exercises. Each of the one or more digital learning platforms and the plurality of digital courses may utilize different pricing and/or pricing structures, such as, but not limited to, subscription pricing, pricing per course, pricing per semester. The digital content program 110 may utilize the one or more key words and/or topics identified at step 202 to search the plurality of digital courses of the one or more digital learning platforms.

In an embodiment, the digital content development program 110 may analyze a sample of one or more digital courses on the digital learning platform identified based on input received by the digital content developer if the digital content development program 110 does not identify any relevant digital courses on the digital learning platform. In this embodiment, the digital content development program 110 may analyze the format, duration, and style of the assets and/or instructional content of the sample of one or more digital courses on the digital learning platform.

At 206, the digital content development program 110 analyzes the one or more relevant digital courses. The digital content development program 110 may utilize one or more analytical techniques in analyzing the one or more relevant digital courses of the one or more digital learning platforms. The digital content development program 110 may analyze at least the instruction content and/or assets of the one or more relevant digital courses of the one or more digital learning platforms. The digital content development program 110 may also analyze a plurality of user information received from a plurality of users of the one or more digital learning platforms and/or received from the one or more digital learning platforms.

Each of the one or more digital learning platforms may have a plurality of users. The digital content development program 110 may receive the plurality of user information from the plurality of users of the one or more digital learning platforms and/or from the one or more digital learning platforms. The plurality of user information may include, but is not limited to including, current job role of a user, desired job role of a user, interest areas, digital course enrollment, digital courses completed, unstructured user feedback on digital courses, structured user feedback on digital courses, assessment scoring, completed coursework, course completion percentages, amongst other user information. The digital content development program 110 may request authorization and/or permission from the plurality of users and/or the digital learning platforms prior to analyzing the plurality of user information. The digital content development program 110 may analyze the plurality of user information only for the plurality of users whom are enrolled and/or have previously completed or enrolled in the one or more or relevant digital courses and for which the digital content development program 110 received authorization and/or permission from the user and/or digital learning platform.

The digital content development program 110 may utilize one or more analytical techniques in analyzing the relevant digital courses of the one or more digital learning platforms and/or the plurality of user information. The one or more analytical techniques may include, but are not limited to including, visual analysis, linguistic analysis, data analysis, amongst others. The one or more analytical techniques may be utilized concurrently in analyzing the relevant digital courses of the one or more digital learning platforms and/or the plurality of user information.

The digital content development program 110 may utilize visual recognition techniques such as, but not limited to, a Convolutional Neural Network (CNN), a Generative Adversarial Network (GAN), amongst other visual recognition techniques, in performing the visual analysis of the plurality of instructional content for each of the one or more relevant digital courses of the one or more digital learning platforms. The digital content development program 110 may utilize the visual recognition techniques in performing the visual analysis of the visual content of the one or more relevant digital courses, such as, but not limited to, video lectures, architectural diagrams, amongst other visual content of the one or more relevant digital courses. For example, the digital content development program 110 may utilize the visual recognition techniques in classifying the video lectures of a relevant digital course by tracking the appearances of what is on the screen during a video lecture. Here, the video lecture may be considered an asset within the plurality of instructional content because the video lecture may be considered a deliverable. The digital content development program 110, utilizing the visual recognition techniques, may derive the following classifications: Lecturer, Lecturer and Bulleted Text Slide, Lecturer and Architectural Diagram, Code Snippet, Stock Imagery, and Titles, wherein the classifications represent how the video lecture is presented and/or formatted for the relevant digital course.

The digital content development program 110 may utilize linguistic techniques such as, but not limited to, a machine learning model with Natural Language Processing (NLP), speech-to-text, amongst other linguistic techniques, such as those implemented in in IBM Watson® (Watson and all Watson-based trademarks are trad arks or registered trademarks of International Business Machines Corporation in the United States, and/or other countries), IBM Watson® Tone Analyzer, IBM Watson® Natural Language Understanding, in performing the linguistic analysis of at least the plurality of instructional content for each of the one or more relevant digital courses of the one or more digital learning platforms and the plurality of user information received from the plurality of users and/or from the one or more digital learning platforms. The linguistic techniques may include utilizing one or more algorithms in keyword extraction, such as, but not limited to, term frequency-inverse document frequency (TF-IDF) and/or Rapid Automatic Keyword Extraction (RAKE), amongst other algorithms. The linguistic techniques may analyze text or text transcripts of the plurality of instructional content for each of the one or more relevant digital courses and/or the plurality of user information to extract metadata from the plurality of instructional content and/or the plurality of user information such as concepts, entities, keywords, categories, sentiment, emotion, relations, semantic roles, syntax, relationships, classifications, amongst other metadata.

The digital content development program 110 may utilize speech-to-text to derive a transcript of a video lecture for a relevant digital course. Utilizing the machine learning model with NLP the digital content development program 110 may extract an entity and one or more associated keywords from the transcript of the video lecture for the relevant digital course. An entity may be a broad term or topic with one or more associated keywords or subtopics. For example, the entity may be a topic such as "Trust Authority" and the one or more associated keywords may be "main key store," usage of the data," "policy," "keys," and "policy information." The digital content development program 110 utilize IBM Watson® Tone Analyzer in assigning a sentiment and/or sentiment score to the entity and one or more associated keywords. The digital content development program 110 may assign a sentiment of negative, neutral, or positive and/or a sentiment score using a numerical value. The digital content development program 110 may assign a sentiment to the entity and one or more associated keywords based on for example user feedback, assessment scores, and questions from users during the video lecture.

The digital content development program 110 may identify relationships between the sentiment scores of an entity and/or keywords by leveraging the one or more analytical techniques. For example, if entities and/or keywords consistently have a more positive sentiment when presented in the Lecturer and Bulleted Text Slide format versus the Lecturer format, then the digital content development program 110 may determine the users of the digital learning platform prefer the Lecturer and Bulleted Text Slide format over the Lecturer format for video lectures.

The digital content development program 110 may utilize data analysis techniques such as, but not limited to, k-nearest neighbor and k-means clustering, in performing the data analysis of at least the content for the one or more relevant digital courses of the one or more digital learning platforms and the plurality of user information received from the plurality of users and/or from the one or more digital learning platforms. The data analysis techniques may analyze non-natural language and/or non-visual instructional content and/or the plurality of user information, such as, but not limited to, assessment scores, course completion percentages, structured user feedback on digital courses, amongst other non-natural language and non-visual instructional content and user information. For example, the digital content development program 110 utilizing the data analysis techniques in classifying the plurality of users of a relevant course by leveraging the plurality of user information to derive emerging characteristics of the plurality of users and the reception of the users to the instructional content of a relevant course. The digital content development program 110 utilizing the data analysis techniques may derive the most frequent job roles of users in enrolled in the relevant course, the median completion percentage of users in those job roles of the relevant course, and the median assessment score per completion quadrant of the relevant course.

For example, the digital content development program 110 may determine the most frequent job roles in the data privacy course on Digital Learning Platform A are: Information Technology (IT) Architect, Technical Sales, and Sales Manager. The median completion percentages for each job role may be: IT Architect (70%), Technical Sales (65%), and Sales Manager (83%). The median assessment score per completion quadrant may be: First Quadrant (94%), Second Quadrant (71%), Third Quadrant (54%) and Fourth Quadrant (25%). On the other hand, the digital content development program 110 may determine the most frequent job roles in the data privacy course on Digital Learning Platform B are: Systems Administrator.

In this example, the digital content development program 110 may leverage the other analytical techniques in determining possible reasons for the low assessment score for the Fourth Quadrant.

The digital content development program 110 may store the information and/or data (e.g., metadata) derived from each of the one or more relevant courses of each of the one or more digital learning platforms in a knowledge corpus (e.g., database 114). The digital content development program 110 may store the information and/or data (e.g., metadata) derived by asset and/or classification. The information and/or data (e.g., metadata) derived may include, but is not limited to including concepts, entities, keywords, categories, sentiment, sentiment scores, emotion, relations, semantic roles, syntax, relationships, classifications, amongst other information and/or data (e.g., metadata).

At 208, the digital content development program 110 evaluates the digital course received from the digital content developer for each of the one or more digital learning platforms. The digital content development program 110 may classify each asset (e.g., video lecture, lab exercise, or other deliverable instructional content) of the plurality of instructional content for each asset (e.g., video lecture, lab exercise, assessment materials, etc.) of the digital course received from the digital content developer using the one or more analytical techniques outlined above with respect to Step 206.

The digital content development program 110 may classify each asset of the digital course by at least format, theme, style, duration, and topic. For example, the digital content development program 110 may classify a video lecture by format, theme, style, duration, and topic. Format may be classified as follows: Lecturer, Lecturer and Bulleted Text Slide, and Code Snippets. Theme may be classified as follows: Marketing Themes, High Level Constructs, and Non-Technical Descriptions. Style may be classified as follows: Simple Production Value and Single Speaker. Duration may be classified as follows: 25 minutes. Topic may be classified as follows: Passport Controller and Data Broker.

The digital content development program 110 may determine a suitability score for each classification of the asset (e.g., video lecture, lab exercise, assessment materials, etc.) of the digital course received from the digital content developer for each digital learning platform. The digital content development program 110 may determine a format suitability score for each format classification, a theme suitability score for each theme classification, a style suitability score or each style classification, a duration suitability score for the duration classification, and a topic suitability score for each topic classification.

The digital content development program 110 may determine the suitability score for each classification of the plurality of instructional content for each asset (e.g., video lecture, lab exercise, assessment materials, etc.) by determining a corresponding classification of the one or more relevant digital courses of the digital learning platform. The digital content development program may determine the corresponding classification of the digital learning platform by searching the information and/or data derived from the one or more relevant courses stored in the knowledge corpus (e.g., database 114). The digital content development program 110 may utilize one or more machine learning algorithms in determining the corresponding classification, such as, but not limited to, k-nearest neighbor.

The digital content development program 110 may determine the similarity between the asset of the digital course received from the digital content developer and the corresponding asset of the relevant digital course for the digital learning platform stored in the knowledge corpus (e.g., database 114). The digital content development program 110 may determine the similarity between the asset and the corresponding asset using a distance function. The digital content development program 110 may utilize Euclidean distances as the distance function. The Euclidean distance may be the shortest distance between two points in an N-dimensional space (e.g., Euclidean space). The Euclidean distance may be a metric to measure the similarity between two data points and may be utilized in various fields. As will be explained in more detail below, the Euclidean distance may be utilized by the digital content development program 110 in determining a confidence score for each suitability score.

The format suitability score may be based on at least the ability of a digital learning platform to present the asset to users and/or the format preferences of the users for the one or more relevant digital courses on the digital learning platform.

The theme suitability score may be based on whether the sentiment of users of the one or more relevant digital courses on the digital learning platform towards the type of content. For example, high level broad content or highly technical content. Another example may be the level of prescriptiveness of a lab exercise, how much instruction does the lab exercise provide versus how much is left to the user to apply knowledge.

The style suitability score may be based on how similar presentations of content have resonated with users of the one or more relevant digital courses on the digital learning platform. For example, the digital content development program 110 determined simple documentation resonates more with users enrolled in Relevant Course A on Digital Learning Platform A based on assessment scores and sentiment analysis. While the digital content development program 110 determined high production video lectures resonates more with users enrolled in Relevant Course B on Digital Learning Platform B based on user feedback and user participation.

The duration suitability score may be based on the at least the length of time required for a user to complete a topic and/or the run time of an asset. For example, Digital Learning Platform A may allocate 45 minutes for a general topic and 5 minutes for a subtopic. Digital Learning Platform B may limit video lectures to 10 minutes. The topic suitability score may be based on whether the one or more topics presented in the asset of the plurality of instructional content has resonated with users of the one or more relevant digital courses on the digital learning platform. The digital content development program 110 may determine whether the asset of the plurality of instructional content resonated with users based on for example, engagement, feedback, ratings, whether users completed the instructional content.

For example, the digital content development program 110 may determine a suitability score for each classification of the digital course received from the digital content developer for Digital Learning Platform A and Digital Learning Platform B. For Digital Learning Platform A, the digital content development program 110 may determine a format suitability score of 60% for Lecturer, 50% for Lecturer and Bulleted Text Slide and 90% for Code Snippets. The digital content development program 110 may also determine the Euclidean Distance for the classification of the digital course received from the digital content developer and the corresponding classification of the one or more relevant digital courses of Digital Learning Platform A. The Euclidean Distance may be high for both Lecturer and Lecturer and Bulleted Text Slide but low for Code Snippets. Accordingly, the confidence scores for the format suitability score for Lecturer and Bulleted Text Slide may be low, while the confidence score for the format suitability score for Code Snippets may be high. For Digital Learning Platform B, the digital content development program 110 may determine a format suitability score of 85% for Lecturer, 90% for Lecturer and Bulleted Text Slide, and 5% for Code Snippets. The digital content development program 110 may also determine the Euclidean Distance for the classification of the digital course received from the digital content developer and the corresponding classification of the one or more relevant digital courses of Digital Learning Platform B. The Euclidean Distance may be low for Lecturer, Lecturer and Bulleted Text Slide, and Code Snippets. Accordingly, the confidence scores for the format suitability score for Lecturer, Lecturer and Bulleted Text Slide, and Code Snippets may be high.

At 210, the digital content development program 110 generates one or more new digital courses for each of the one or more digital learning platforms using the plurality of instructional content of the digital course received from the digital content developer.

The digital content development program 110 may generate the one or more new digital courses for each of the one or more digital learning platforms based on the suitability score determined for each classification of the plurality of instructional content for each asset (e.g., video lecture, lab exercise, assessment materials, etc.). The one or more new digital courses generated by the digital content development program 110 may be based on the plurality of instructional content of the digital course received from the digital content developer. The digital content development program 110 may reformat, cut, and/or combine the plurality of instructional content to generate the one or more new digital courses. The one or more new digital courses may be generated for different users of each of the one or more digital learning platforms as well as multiple digital courses.

The digital content developer may review and/or provide feedback based on the one or more new digital courses generated by the digital content developer program 110. The digital may utilize the reviews and/feedback to improve the generating of the one or more new digital courses in the future.

The digital content development program 110 may include all topics determined to be relevant to the course irrespective of the suitability score. The digital content development program may determine a topic's relevancy based on at least, the frequency in which the topic appears in the one or more relevant digital courses, the topics frequency in course outlines and/or course objectives, the manner in which the topic is presented in the instructional content, such as, in the title versus in the footnotes of a presentation slide, amongst other relevancy factors.

The digital content development program 110 may also provide one or more recommendations to the digital content developer based on the plurality of instructional content of the digital course received from the digital content developer, such as, but not limited to, inclusion of an asset as-is, recommended modification of the asset, recommended exclusion of the asset, amongst other recommendations. For example, recording a video lecture to replace a lab exercise.

The digital content development program 110 may also recommend pricing and/or a pricing structure for the one or more new digital courses based on the digital learning platform. The digital content development program 110 may utilize a pricing algorithm to determine fair market value of the one or more new digital courses based on the pricing and/or pricing structure of the digital learning platform and/or the pricing and/or pricing structure of the one or more relevant digital courses of the digital learning platform.

The digital content development program 110 may utilize the the plurality of user information from the one or more digital learning platforms in generating one or more new digital courses for a digital learning platform with no relevant digital courses or generate one or more new digital courses based on criteria and/or the plurality of input received from the digital content developer.

In another embodiment, the digital content development program 110 may be utilized by the one or more digital learning platforms to improve the plurality of digital courses on the digital learning platform. By providing one or more recommendations based on relevant digital courses of other digital learning platforms.

It may be appreciated that FIG. 2 and provides only an illustration of one embodiment and do not imply any limitations with regard to how different embodiments may be implemented. Many modifications to the depicted embodiment(s) may be made based on design and implementation requirements.

Figure 3:
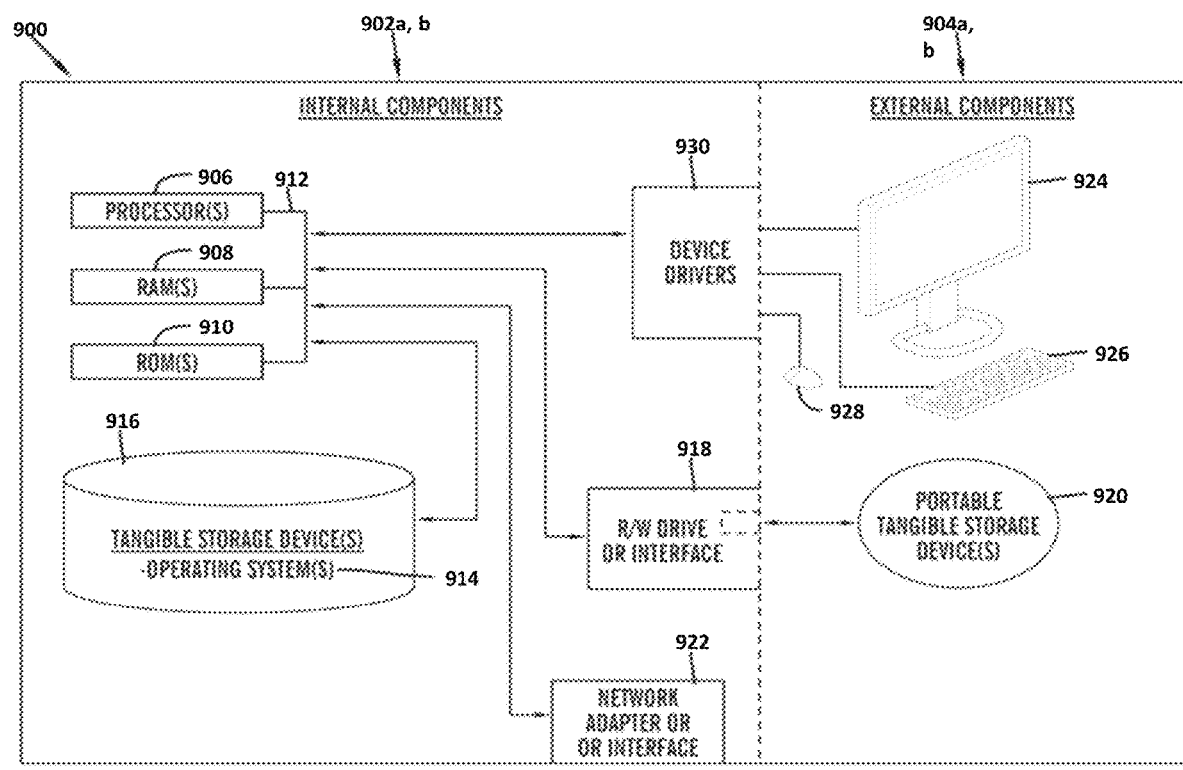
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 3. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the digital content development program 110*a* in client computer 102, and the program 110*b* in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the digital content development program 110*a* and 110*b* can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the digital content development program 110*a* in client computer 102 and the digital content development program 110*b* in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the digital content development program 110*a* in client computer 102 and the digital content development program 110*b* in network server computer 112 are loaded into the respective hard drive 916. The network may comprise copper wires, optical fibers, wireless transmission, routers, firewalls, switches, gateway computers and/or edge servers.

Each of the sets of external components 904 *a, b* can include a computer display monitor 924, a keyboard 926, and a computer mouse 928. External components 904 *a, b* can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
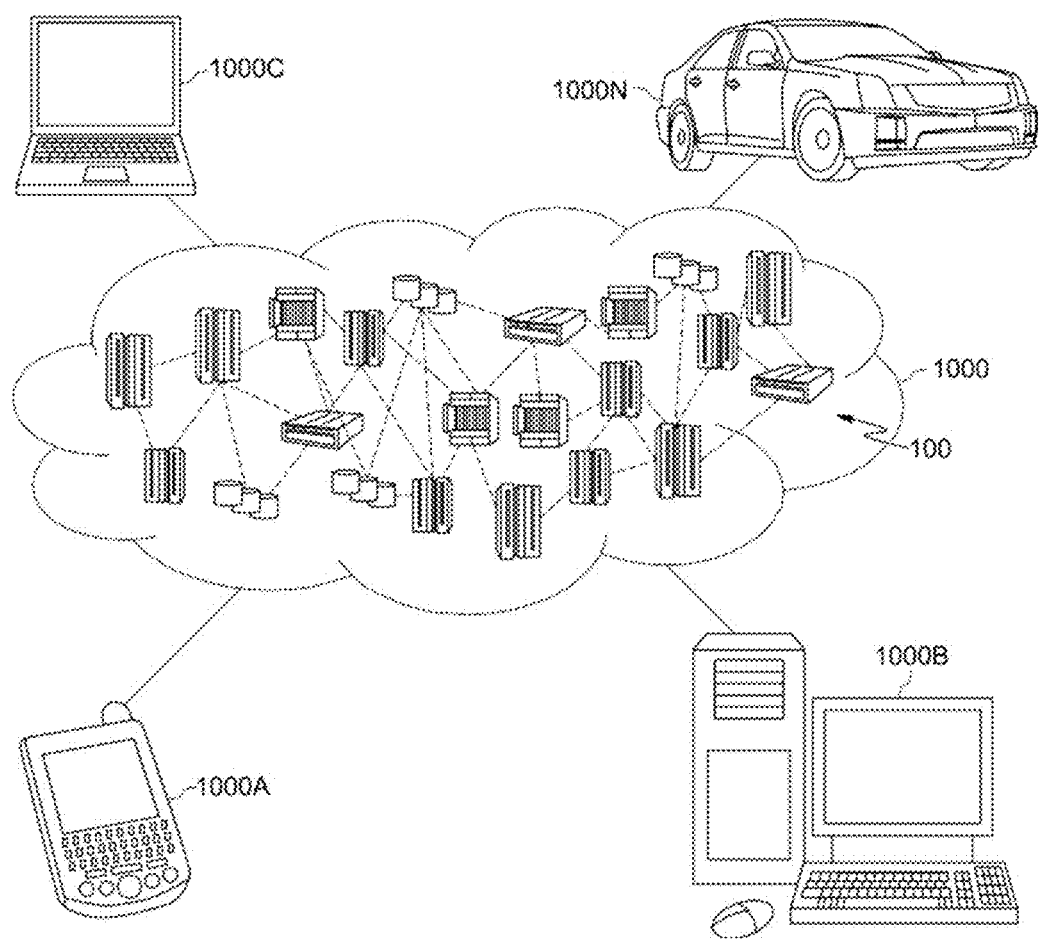
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
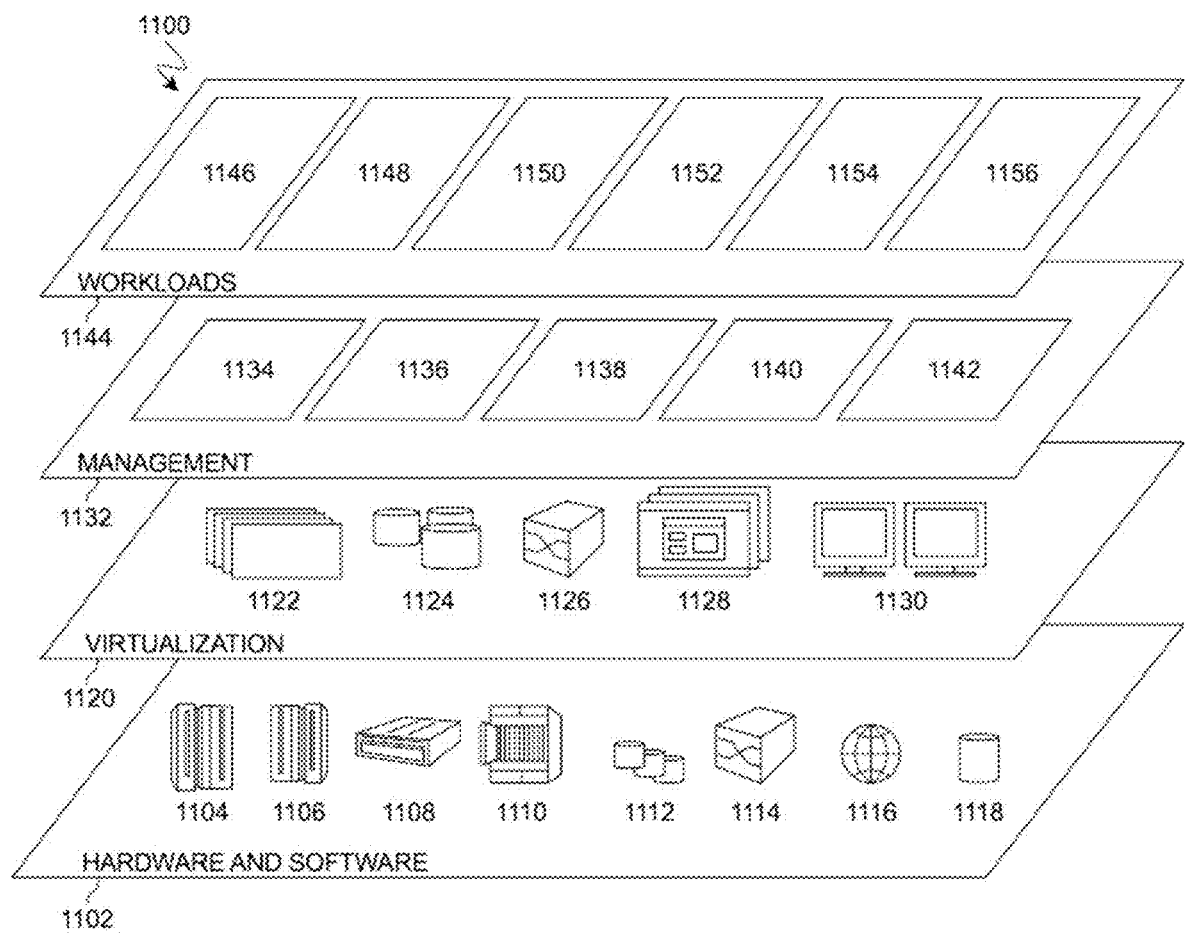
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and digital content development 1156. A digital content development program 110a, 110b provides a way to generate one or more new digital courses for one or more digital learning platforms based on a suitability score determined for each classification of each asset of a plurality of instructional content received from a digital content developer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

The present disclosure shall not be construed as to violate or encourage the violation of any local, state, federal, or international law with respect to privacy protection.

What is claimed is:

1. A method for digital content development, the method comprising:
   identifying one or more keywords associated with a digital course received from a digital content developer, wherein the digital course is comprised of a plurality of instructional content;
   identifying one or more relevant digital courses of one or more digital learning platforms using the one or more keywords associated with the digital course received from the digital content developer;
   analyzing the one or more relevant digital courses using one or more analytical techniques;
   evaluating the digital course received from the digital content developer for each of the one or more digital learning platforms; and
   generating one or more new digital courses for each of the one or more digital learning platforms using the plurality of instructional content of the digital course received from the digital content developer.

2. The method of claim 1, wherein the one or more keywords are identified based on at least the plurality of instructional content of the digital course and a plurality of input information received from the digital content developer.

3. The method of claim 1, wherein the one or more analytical techniques include at least visual analysis, linguistic analysis, and data analysis.

4. The method of claim 1, wherein analyzing the one more relevant digital course further comprises:
   requesting a plurality of user information for the one or more relevant courses; and
   analyzing the plurality user information using the one or more analytical techniques, wherein the plurality of user information includes at least structured user feedback and unstructured user feedback for the one or more relevant digital courses.

5. The method of claim 1, wherein evaluating the digital course received from the digital content developer further comprises:
   classifying the plurality of instructional content for each asset of the digital course, wherein the plurality of instructional content for each asset is classified by at least format, theme, style, duration, and topic; and
   determining a suitability score for each asset according to classification for each of the one or more digital learning platforms, wherein the suitability score is determined using a corresponding classification of the one or more digital learning platforms.

6. The method of claim 1, further comprising:
   providing one or more recommendations to the digital content developer for each of the one or more new digital courses.

7. The method of claim 1, wherein generating the one or more new digital courses further comprises:
   reformatting the plurality of instructional content received from the digital content developer based on a suitability score determined for each classification of each asset of the plurality of instructional content.

8. A computer system for digital content development, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
- identifying one or more keywords associated with a digital course received from a digital content developer, wherein the digital course is comprised of a plurality of instructional content;
- identifying one or more relevant digital courses of one or more digital learning platforms using the one or more keywords associated with the digital course received from the digital content developer;
- analyzing the one or more relevant digital courses using one or more analytical techniques;
- evaluating the digital course received from the digital content developer for each of the one or more digital learning platforms; and
- generating one or more new digital courses for each of the one or more digital learning platforms using the plurality of instructional content of the digital course received from the digital content developer.

9. The computer system of claim 8, wherein the one or more keywords are identified based on at least the plurality of instructional content of the digital course and a plurality of input information received from the digital content developer.

10. The computer system of claim 8, wherein the one or more analytical techniques include at least visual analysis, linguistic analysis, and data analysis.

11. The computer system of claim 8, wherein analyzing the one more relevant digital course further comprises:
- requesting a plurality of user information for the one or more relevant courses; and
- analyzing the plurality user information using the one or more analytical techniques, wherein the plurality of user information includes at least structured user feedback and unstructured user feedback for the one or more relevant digital courses.

12. The computer system of claim 8, wherein evaluating the digital course received from the digital content developer further comprises:
- classifying the plurality of instructional content for each asset of the digital course, wherein the plurality of instructional content for each asset is classified by at least format, theme, style, duration, and topic; and
- determining a suitability score for each asset according to classification for each of the one or more digital learning platforms, wherein the suitability score is determined using a corresponding classification of the one or more digital learning platforms.

13. The computer system of claim 8, further comprising:
- providing one or more recommendations to the digital content developer for each of the one or more new digital courses.

14. The computer system of claim 8, wherein generating the one or more new digital courses further comprises:
- reformatting the plurality of instructional content received from the digital content developer based on a suitability score determined for each classification of each asset of the plurality of instructional content.

15. A computer program product for digital content development, comprising:
one or more non-transitory computer-readable storage media and program instructions stored on at least one of the one or more tangible storage media, the program instructions executable by a processor to cause the processor to perform a method comprising:
- identifying one or more keywords associated with a digital course received from a digital content developer, wherein the digital course is comprised of a plurality of instructional content;
- identifying one or more relevant digital courses of one or more digital learning platforms using the one or more keywords associated with the digital course received from the digital content developer;
- analyzing the one or more relevant digital courses using one or more analytical techniques;
- evaluating the digital course received from the digital content developer for each of the one or more digital learning platforms; and
- generating one or more new digital courses for each of the one or more digital learning platforms using the plurality of instructional content of the digital course received from the digital content developer.

16. The computer program product of claim 15, wherein the one or more keywords are identified based on at least the plurality of instructional content of the digital course and a plurality of input information received from the digital content developer.

17. The computer program product of claim 15, wherein the one or more analytical techniques include at least visual analysis, linguistic analysis, and data analysis.

18. The computer program product of claim 15, wherein analyzing the one more relevant digital course further comprises:
- requesting a plurality of user information for the one or more relevant courses; and
- analyzing the plurality user information using the one or more analytical techniques, wherein the plurality of user information includes at least structured user feedback and unstructured user feedback for the one or more relevant digital courses.

19. The computer program product of claim 15, wherein evaluating the digital course received from the digital content developer further comprises:
- classifying the plurality of instructional content for each asset of the digital course, wherein the plurality of instructional content for each asset is classified by at least format, theme, style, duration, and topic; and
- determining a suitability score for each asset according to classification for each of the one or more digital learning platforms, wherein the suitability score is determined using a corresponding classification of the one or more digital learning platforms.

20. The computer program product of claim 15, further comprising:
- providing one or more recommendations to the digital content developer for each of the one or more new digital courses.

* * * * *